(12) United States Patent
Dick (10) Patent No.: US 6,460,061 B1
(45) Date of Patent: Oct. 1, 2002

(54) 2-DIMENSIONAL DISCRETE COSINE TRANSFORM USING A POLYNOMIAL TRANSFORM

(75) Inventor: Christopher H. Dick, San Jose, CA (US)

(73) Assignee: Xilinx Inc., San Jose, CA (US)

( * ) Notice: Subject to any disclaimer, the term of this patent is extended or adjusted under 35 U.S.C. 154(b) by 0 days.

(21) Appl. No.: 09/430,521

(22) Filed: Oct. 29, 1999

(51) Int. Cl.$^7$ ................................................ G06F 17/14
(52) U.S. Cl. ..................... 708/401; 708/400; 708/402
(58) Field of Search ............................... 708/400, 401, 708/402, 403; 382/100, 232, 276; 341/50; 348/420; 712/300; 375/240; 704/203; 364/725

(56) References Cited

U.S. PATENT DOCUMENTS

| | | | | |
|---|---|---|---|---|
| 3,777,130 A | | 12/1973 | Croisier et al. ............. 708/307 |
| 4,164,023 A | * | 8/1979 | Whitehouse et al. .... 348/403.1 |
| 5,031,038 A | * | 7/1991 | Guillemot et al. ........ 375/240.2 |
| 5,181,183 A | * | 1/1993 | Miyazaki .................... 708/402 |
| 5,363,096 A | * | 11/1994 | Duhamel et al. ............. 341/50 |
| 5,408,425 A | * | 4/1995 | Hou ........................... 708/402 |
| 5,566,123 A | | 10/1996 | Freidin et al. ................ 396/38 |
| 5,758,192 A | | 5/1998 | Alfke .......................... 710/52 |
| 6,119,080 A | * | 9/2000 | Liu et al. .................... 704/203 |
| 6,343,304 B1 | * | 1/2002 | Yang et al. ................. 708/402 |

OTHER PUBLICATIONS

H.J. Nussbaumer and P. Quandralle, "Computation of Convolutions and Discrete Fourier Transforms by Polynomial Transforms", IBM Journal of Research and Development, vol. 22, No. 2, Mar. 1978, pp. 134–144.

James W. Cooley and John W. Tukey, "An Algorithm for the Machine Calculation of Complex Fourier Series", Mathematics of Computation—A Quarterly Journal Edited by Harry Polachek, XIX, Nos. 89–92, 1965, pp. 297–301.

P. Duhamel and C. Guillemot, "Polynomial Transform Computation of the 2–D DCT", IEEE International Conference on Acoustics, Speech and Signal Processing, vol. 3, ICASSP 90, Apr. 3–6, 1990, pp. 1515–1518.

S. C. Chan and K. L. Ho, "A New Two–Dimensional Fast Cosine Transform Algorithm", IEEE Transactions on Signal Processing, formerly IEEE Transactions on Acoustics, Speech, and Signal Processing, vol. 39, No. 2, Feb. 1991, pp. 481–485.

H. R. Wu and F. J. Paoloni, "A Two–Dimensional Fast Cosine Transform Algorithm Based on Hou's Approach", IEEE Transactions on Signal Processing, formerly IEEE Transactions on Acoustics, Speech, and Signal Processing, vol. 39, No. 2, Feb. 1991, pp. 544–546.

The Programmable Logic Data Book 1999, available from Xilinx, Inc., 2100 Logic Drive, San Jose, California 95124, pp. 3–7.

J. Prado and P. Duhamel, "A Polynomial Transform Based Computation of the 2–D DCT with Minumum Multplicative Complexity", IEEE International Conference on Acoustics, Speech and Signal Processing (ICASSP), 1996, pp. 1347–1350.

* cited by examiner

*Primary Examiner*—Gregory Morse
*Assistant Examiner*—Chat Do
(74) *Attorney, Agent, or Firm*—LeRoy D. Maunu; Edel M. Young (57) ABSTRACT

A circuit arrangement and method for performing the 2-D DCT. An input permutation processor reorders input samples, constructing a logical matrix of input samples. A plurality of 1-D DCT processors are arranged to receive the reordered data and apply the 1-D DCT along extended diagonals of the matrix. The output polynomials from the 1-D DCT processors are provided to a polynomial transform processor, and the output data from the polynomial transform processor are reordered, by an output permutation processor. The 1-D DCT processors and polynomial transform are multiplier free, thereby minimizing usage of FPGA resources in an FPGA implementation.

30 Claims, 7 Drawing Sheets

FIG. 1

| 0,0 | 0,1 | 0,2 | 0,3 | 0,4 | 0,5 | 0,6 | 0,7 |
|---|---|---|---|---|---|---|---|
| 1,0 | 1,1 | 1,2 | 1,3 | 1,4 | 1,5 | 1,6 | 1,7 |
| 2,0 | 2,1 | 2,2 | 2,3 | 2,4 | 2,5 | 2,6 | 2,7 |
| 3,0 | 3,1 | 3,2 | 3,3 | 3,4 | 3,5 | 3,6 | 3,7 |
| 4,0 | 4,1 | 4,2 | 4,3 | 4,4 | 4,5 | 4,6 | 4,7 |
| 5,0 | 5,1 | 5,2 | 5,3 | 5,4 | 5,5 | 5,6 | 5,7 |
| 6,0 | 6,1 | 6,2 | 6,3 | 6,4 | 6,5 | 6,6 | 6,7 |
| 7,0 | 7,1 | 7,2 | 7,3 | 7,4 | 7,5 | 7,6 | 7,7 |

150

↑ stage 1 input permutation

| 0,0 | 0,2 | 0,4 | 0,6 | 0,7 | 0,5 | 0,3 | 0,1 |
|---|---|---|---|---|---|---|---|
| 2,0 | 2,2 | 2,4 | 2,6 | 2,7 | 2,5 | 2,3 | 2,1 |
| 4,0 | 4,2 | 4,4 | 4,6 | 4,7 | 4,5 | 4,3 | 4,1 |
| 6,0 | 6,2 | 6,4 | 6,6 | 6,7 | 6,5 | 6,3 | 6,1 |
| 7,0 | 7,2 | 7,4 | 7,6 | 7,7 | 7,5 | 7,3 | 7,1 |
| 5,0 | 5,2 | 5,4 | 5,6 | 5,7 | 5,5 | 5,3 | 5,1 |
| 3,0 | 3,2 | 3,4 | 3,6 | 3,7 | 3,5 | 3,3 | 3,1 |
| 1,0 | 1,2 | 1,4 | 1,6 | 1,7 | 1,5 | 1,3 | 1,1 |

152 cell 0,7

FIG. 2

FIG. 3A FIG. 3B FIG. 3C FIG. 3D
FIG. 3E FIG. 3F FIG. 3G FIG. 3H $$
\begin{bmatrix} x_0 & x_1 & x_2 & x_3 & x_4 & x_5 & x_6 & x_7 \end{bmatrix}
\begin{bmatrix}
C_0 & -C_1 & C_2 & C_3 & C_4 & -C_5 & C_6 & -C_7 \\
C_0 & -C_3 & C_6 & C_7 & -C_4 & C_1 & -C_2 & C_5 \\
C_0 & -C_5 & -C_6 & C_1 & -C_4 & -C_7 & C_2 & -C_3 \\
C_0 & -C_7 & -C_2 & -C_5 & C_4 & -C_3 & -C_2 & C_1 \\
C_0 & C_7 & -C_2 & -C_5 & C_4 & C_3 & -C_2 & -C_1 \\
C_0 & C_5 & -C_6 & -C_1 & -C_4 & C_7 & C_2 & C_3 \\
C_0 & C_3 & C_6 & -C_7 & -C_4 & -C_1 & -C_2 & -C_5 \\
C_0 & C_1 & C_2 & C_3 & C_4 & C_5 & C_6 & C_7
\end{bmatrix}
= a_k
\begin{bmatrix} Y_0 & Y_1 & Y_2 & Y_3 & Y_4 & Y_5 & Y_6 & Y_7 \end{bmatrix}
$$

2-DIMENSIONAL DISCRETE COSINE TRANSFORM USING A POLYNOMIAL TRANSFORM

FIELD OF THE INVENTION

The present invention generally relates to the 2-dimensional (2-D) discrete cosine transform (DCT), and more particularly to implementing the 2-D forward and inverse DCT on an FPGA using a polynomial transform.

BACKGROUND

The 2-D DCT is at the heart of many low-rate codecs for video compression. For example, the DCT is an integral part of the MPEG and H.261 standards. The DCT's time efficient computation is also of great interest in various communications and multi-media applications.

There are several strategies available to the digital signal processing (DSP) system engineer for realizing a DCT-based codec. One option is to use a software programmable DSP processor such as the TMS320C5x from Texas Instruments. This brings high flexibility to a design at the expense of performance. At the other end of the implementation spectrum is an ASIC solution, which provides high performance with little or no flexibility. A third option includes field programmable gate arrays (FPGAs).

FPGAs offer high-performance without sacrificing design flexibility The conventional technique for realizing a 2-D DCT is to exploit the transform separability and decompose the problem into a sequence of 1-D sub-problems. That is, first a 1-D DCT is performed on the rows, followed by a 1-D DCT on the columns. For high-resolution N×N-pixel (N>=1024) color images, a parallel architecture that incorporates row and column, processors as well as a matrix transposition engine must be used to accommodate real-time data rates. Using distributed arithmetic (as described in U.S. Pat. No. 3,77,130 entitled, "Digital Filter for PCM Encoded Signals" to Croisier et al.) to implement a 1-D DCT on an FPGA can greatly reduce the number of configurable logic blocks (CLB s) used for the DCT.

While distributed arithmetic reduces the number of CLBs of an FPGA that are used to implement the 2-D DCT, it is desirable for economic reasons to further reduce the number of CLB used to implement the 2-D DCT.

SUMMARY OF THE INVENTION

The present invention includes a circuit arrangement that implements a 2-D forward and inverse DCT using a polynomial transform. In one embodiment, an input permutation processor reorders input sample data, wherein the reordered data samples logically form a matrix. A plurality of 1-D DCT processors are coupled to the input permutation processor. Extended diagonals passing through the matrix reference data that are provided as input to respective 1-D DCT processors, which operate in parallel. Output data from the 1-D DCT processors are provided as input data to a polynomial transform processor. The polynomial transform processor applies a polynomial transform to data from the 1-D DCTs, and output data from the polynomial transform processor are re-ordered in a prescribed order for 2-D DCT outputs.

In another embodiment the various processors and storage elements are implemented on FPGA function generators. Since the 1-D DCT processors and polynomial transform are multiplier free, usage of FPGA resources is minimized.

Various embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The present invention uses a polynomial transform to compute the i2-D DCT on an FPGA. The paper by J. Prado and P. Duhamel entitled "A Polynomial Transform Based Computation of the 2-D DCT with Minimum Multiplicative Complexity", IEEE International Conference on Acoustics, Speech and Signal Processing, pp. 1347–1350, 1996 (hereinafter, "Prado") further describes the mathematical basis of the polynomial transform of the 2-D DCT.

Figure 1:
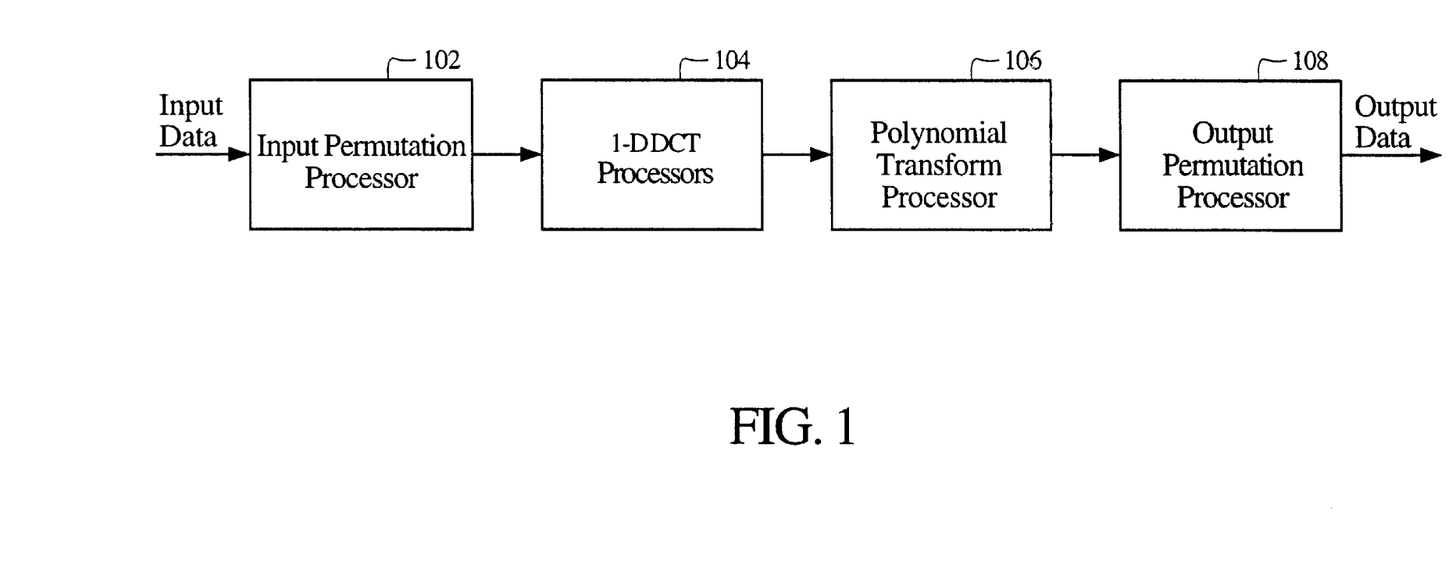
FIG. 1 is a functional block diagram of a system for performing a 2-D DCT using a polynomial transform, according to one embodiment of the invention.

FIG. 1 is a functional block diagram of a system for performing a 2-D DCT using a polynomial transform, according to one embodiment of the invention. The system includes input-permutation processor 102, 1-D DCT processor 104, polynomial transform (PT) processor 106, and output permutation processor 108.

Input data is provided to input-permutation processor 102. For example, in a video processing application the input data may be represented as an 8×8 matrix of pixel data. Input-permutation processor 102 reorders the pixel data in accordance with the following known definition of a permuted sequence:

$Y_{n_1}, n_2 = X_{2n_1}, 2n_2$
$Y_{N-n_1}-1, n_2 = X_{2n_1}+1, 2n_2$
$Y_{n_1}, N-n_2-1 = X_{2n_1}, 2n_2+1$
$Y_{N-n_1}, N-n_2-1 = X_{2n_1}+1, 2n_2+1$ where $n_1, n_2 = 0, \ldots N/2-1$ The reordered data can be represented as a matrix in which the original input data in the original matrix has been moved in accordance with the above definition. Input-permutation processor 102 assembles the reordered data into 8 independent memories (riot shown), each containing data associated with selected diagonals of the matrix (see FIGS. 2 and 3A–H).

1-D DCT processor 104 is comprised of a set of units that perform the 1-D DCTs in parallel using distributed arithmetic. In general, each unit requires b+1 clock cycles to complete a 1-D N-point DCT, where b is the number of bits in a data sample (e.g., 8). Since the polynomial transform (PT) processing overlaps the first stage DCT calculation, the data re-ordering must be completed in b+1 clock cycles so that processor 106 is not left waiting for data. In the available b +1 cycles, $N^2$ numbers must be accessed by DCT processor 104. This is achieved by presenting the data as polynomials of degree (N−1) to the input stage of DCT processor 104. Thus, for the common example case of N=8 with 8-bit data samples, a 64-bit data bus can be used to provide eight 8-bit samples at each clock cycle.

Polynomial transform processor 106 implements the mathematically defined polynomial. The following equation is one expression of a polynomial transform:

$$\breve{Y}_{n_1} = \sum_{k_1=0}^{N-1} Y_{k_1}(z) z^{(4n_1+1)k_1} \mod(z^N + j)$$

One embodiment for computing the polynomial transform is via a direct evaluation of the equation above. However, this approach is not optimal in that sub-expressions are not shared between the output terms, which results in additional arithmetic, and therefore, additional hardware resource requirements.

Analysis of the polynomial transform equation reveals that the output terms share sub-expressions in much the same way that the output terms of a discrete Fourier transform share common sub-terms. To produce an optimal solution, from a hardware requirement reference, it is desirable to compute each sub-term only once, and combine these components to produce the final polynomial transform result. This can be achieved using a radix-2 partitioning of the problem. The partitioning is very similar to the standard radix-2 partitioning used for the common radix-2 Cooley-Tukey (CT) fast Fourier transform. The CT algorithm employs operations on elements in the complex field, while the fast polynomial transform, that is the radix-2 based approach, operates on elements that are taken from the polynomial field.

Output permutation processor 108 reorders the output to produce the final result. As will be seen from FIG. 6, the output terms from the polynomial transform processor 106 are output in a permuted fashion. That is, the top output arm generates $P_0(z)$, with successive output ports generating, $P_4(Z)$, $P_2(Z)$, $P_6(Z)$, $P_1(Z)$, $P_5(z)$, $P_3(z)$ and $P_7(z)$ respectively. The natural and preferred. ordering of the results would be $P_0(z)$, $P_1(z)$, $P_2(z)$, $P_3(Z)$, $P_4(Z)$, $P_5(z)$, $P_6(z)$ and $P_7(Z)$. Output permutation processor 108 rearranges the permuted result to generate the naturally ordered transform as the final result.

Processing blocks 102, 104, 106, and 108 operate in parallel. Thus, while DCT processors 104 are operating on data set i, polynomial transform processors 106 are operating on data set i−1, output permutation processor is operating on data set i−2, and input permutation processor 102 is operating on data set i+1.

Figure 2:
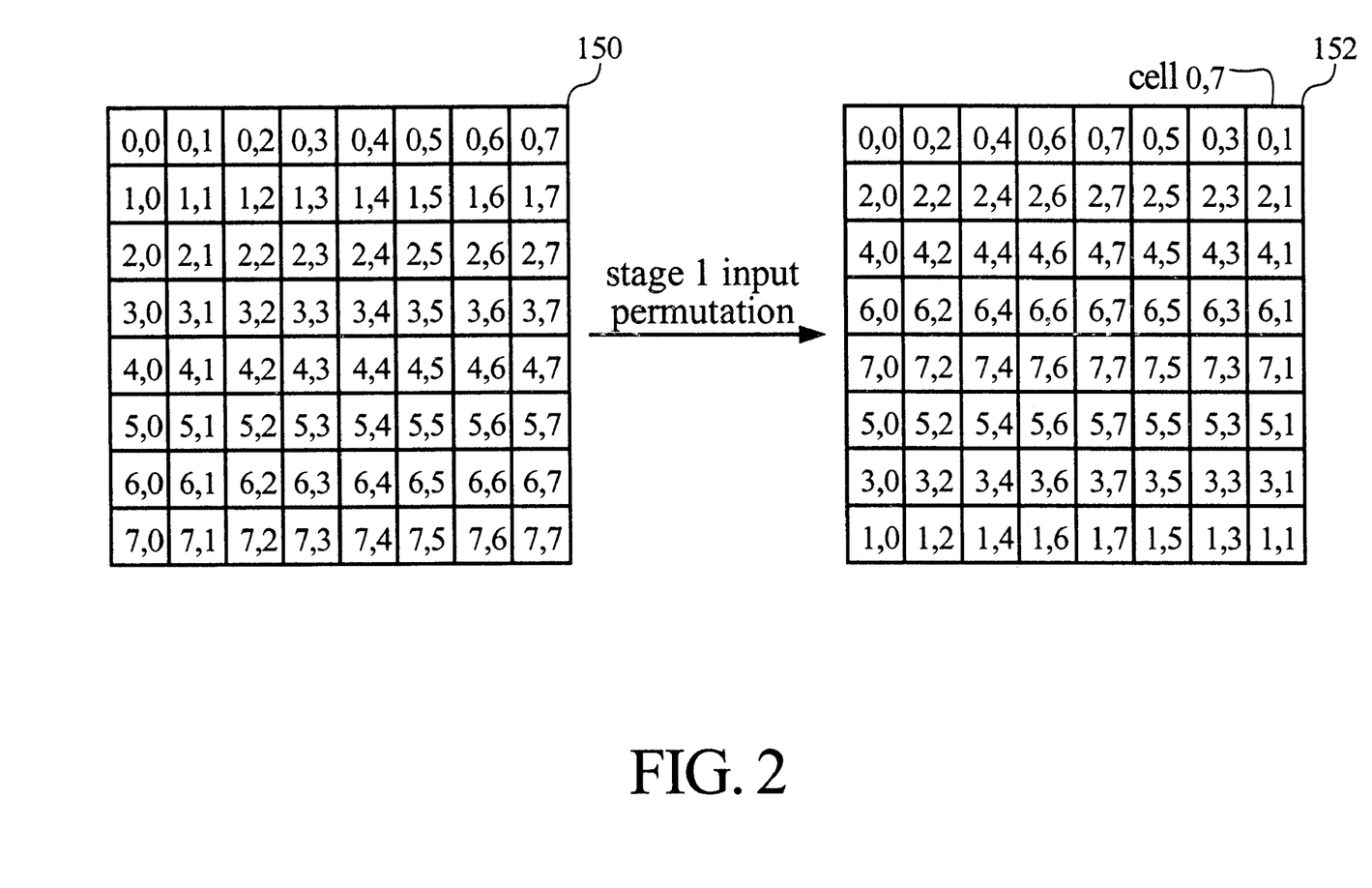
FIG. 2. shows an example reordering of input data.

FIG. 2 shows an example reordering of input data in accordance with the permuted sequence defined above. Matrix 150 represents the input data, and matrix 152 represents the reordered input data. The entries in the cells in matrix 150 denote the row and column coordinates of the original input data, and the entries in the cells in matrix 152 show how data referenced by the original coordinates is reordered in matrix 152. For example, the data of cell 0,1 in matrix 150 is moved to cell 0,7 in matrix 152, as can be seen from "0,1" occupying cell 0,7 in matrix 152. In other words, cell 0,7 of matrix 152 has the data from cell 0,1 of matrix 150.

It will be appreciated that the address sequencing required to effect the data reordering can be accomplished with an FPGA. An address generator can be customized to satisfy the data access requirements without impacting the processing time.

FIGS. 3A–H illustrate the 8 extended diagonals of matrix 152 that are used to compute the 1-D DCTs. In one embodiment, all the 1-D DCTs are computed in parallel. It will be appreciated that the 8 diagonals cover all the cells in the matrix.

Figure 3A:
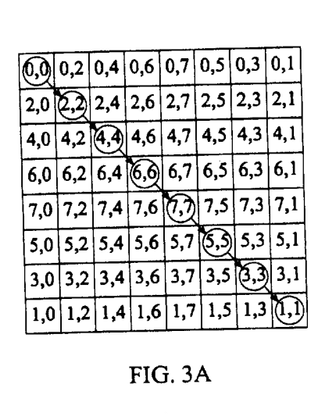
FIGS. 3A–H illustrate 8 extended diagonals of a matrix, where the data on the diagonals are used to compute 1-D DCTs.
Figure 3B:
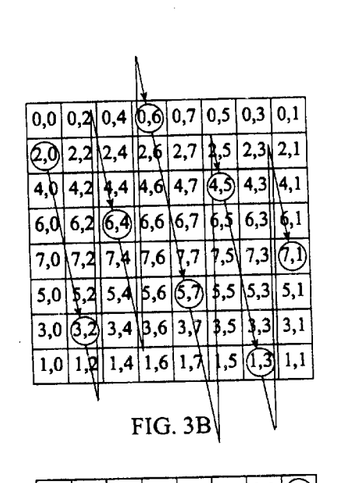
Figure 3C:
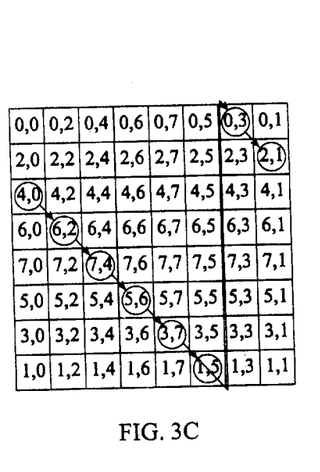
Figure 3D:
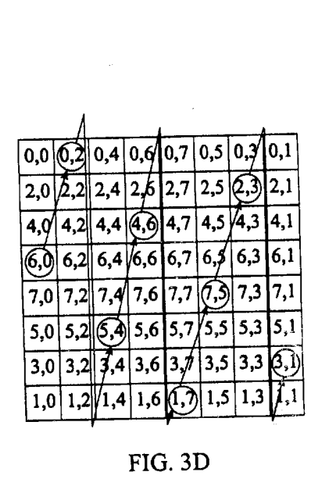
Figure 3E:
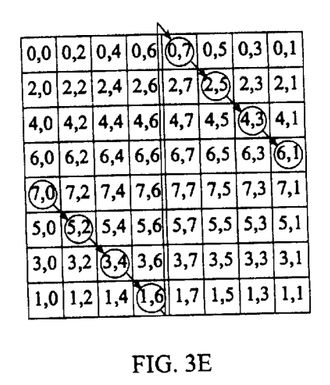
Figure 3F:
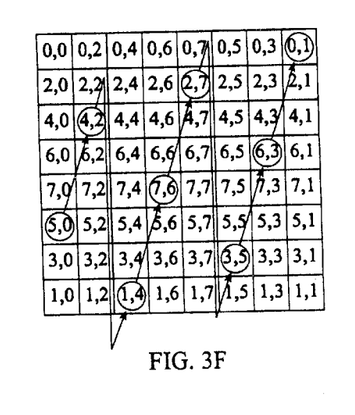
Figure 3G:
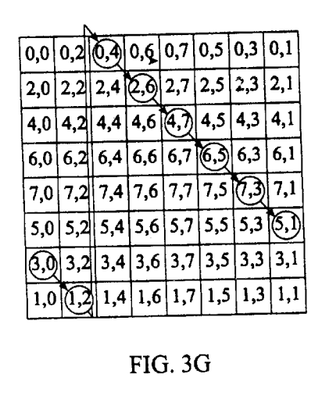
Figure 3H:
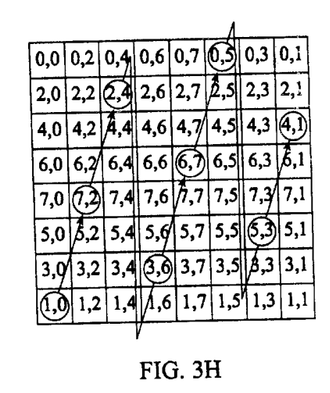

In FIG. 3A, the diagonal begins at cell 0,0 and progresses, by moving down one row and over one column until column 7 is reached at cell 7,7. In FIG. 3B, the diagonal begins at cell 1,0 (row 1, column 0) and progresses by moving down 5 rows and over 1 column. Note that after the last row is reached, row counting circles back to row 0. FIGS. 3C–3H show the remaining extended diagonals that comprise the other sets of sample inputs to the 1-D DCTs.

Figure 4:
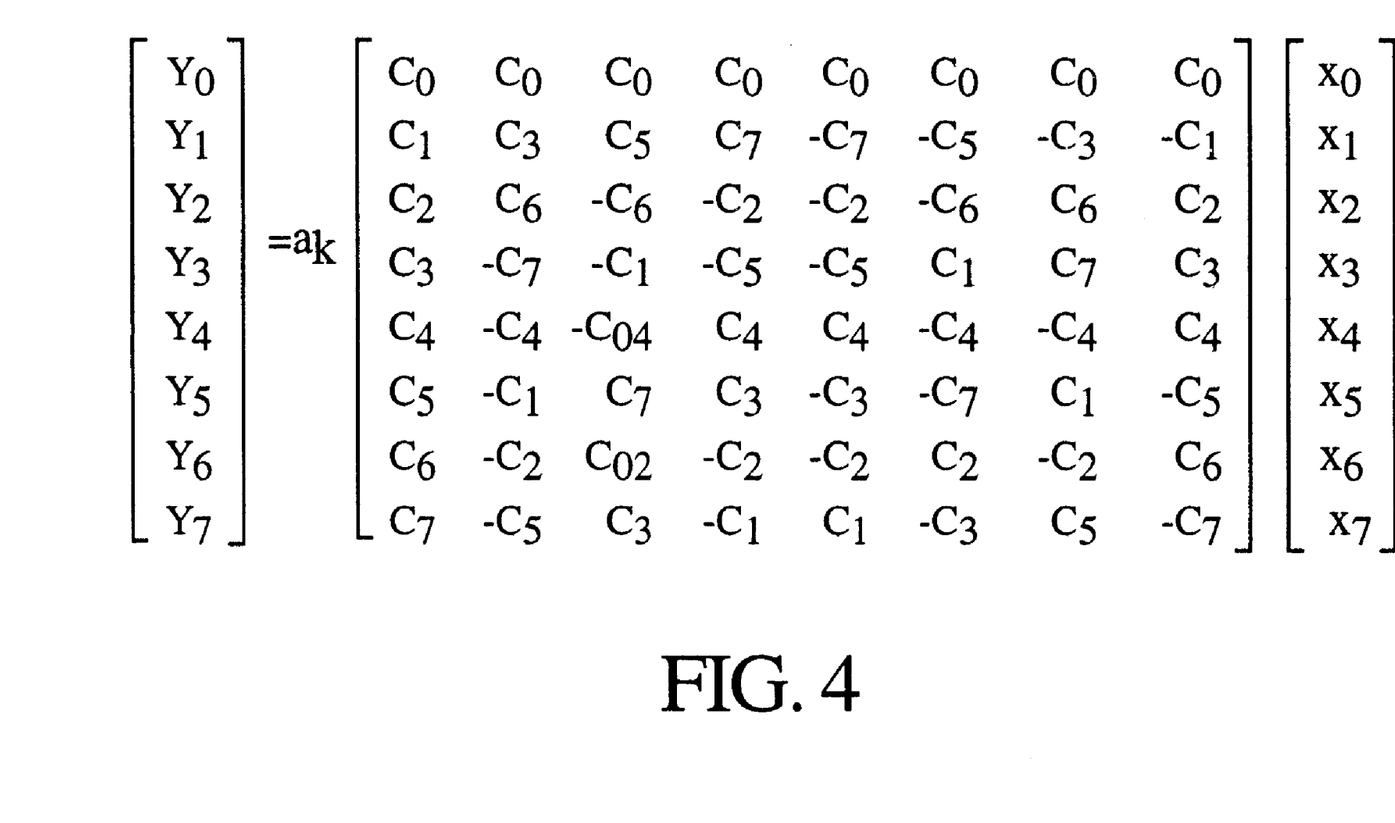
FIG. 4 shows the matrix-vector form of the 1-D DCT for the case N=8.

FIG. 4 shows the matrix-vector form of the 1-D DCT for the case N=8. The matrix-vector form is shown to illustrate application of the 1-D DCT using the extended diagonals for FIGS. 3A–H and to illustrate operation of polynomial, transform processor 106. It will be appreciated that each DCT output sample $Y_k$(k=0, 1, . . . 7), can be computed as a vector dot-product of the basis function $C_k$(k=0, 1, . . . 7), and input samples $X_i$(i=0, 1, . . . 7), where $C_k$=cos(2πk/32). That is, $Y_0=C_0X_0+C_0X_1+C_0X_2+C_0X_3+C_0X_4+C_0X_5+C_0X_6+C_0X_7$; $Y_1=C_1X_0+C_3X_1+C_5X_2+C_7X_3-C_7X_4-C_5X_5-C_3X_6-C_1X_7$; etc. Note that:

$$\alpha_k = \begin{cases} \frac{1}{\sqrt{N}} & \text{when } k = 0 \\ \frac{\sqrt{2}}{\sqrt{N}} & \text{when } k = 1, \ldots, N-1 \end{cases}$$

Recall that DCT processor 104 computes the 1-D DCTs along the extended diagonals of the reordered data (example extended diagonals of a reordered 8×8 data set are illustrated in FIGS. 3A–H). DCT processor 104 includes a plurality of 1-D DCT processing units, each arranged to compute the 1-D DCT of a respective one of the extended diagonals. For example, relative to the data set of FIG. 3A, one processing unit computes $Y_0=C_0X_{0,0}+C_0X_{2,2}+C_0X_{4,4}+C_0X_{6,6}+C_0X_{7,7}+C_0X_{5,5}+C_0X_{3,3}+C_0X_{1,1}$; $Y_1=C_1X_{0,0}+C_3X_{2,2}+C_5X_{4,4}+C_7X_{6,6}-C_7X_{7,7}-C_5X_{5,5}-C_3X_{3,3}-C_1X_{1,1}$; . . . ; $Y_7=C_7X_{0,0}-C_5X_{2,2}+C_3X_{4,4}-C_1X_{6,6}+C_1X_{7,7-C3}X_{5,5}+C_5X_{3,3}-C_7X_{1,1}$; and so on for FIGS. 3C–3H. It will be appreciated that even though the same output sample names (e.g., $Y_0$) are used above for explaining computation of the 1-D DCTs for the different extended diagonals, there are separate data paths for the respective 1l-D DCT output samples so that $Y_0$ of the extended diagonal of FIG. 3A is not confused with $Y_0$ of the extended diagonal o FIG. 3B. In one embodiment, distributed arithmetic is used to compute the 8 DCTs along the extended diagonals.

Unlike the row-column based DCT method, the present method does not require a second set of 8 1-D DCTs. Instead, a DCT polynomial transform is applied to the 1-D DCT outputs from DCT processor 104. The polynomial transform is comprised adders and subtractors, and no multipliers, which reduces the number of FPGA resources consumed.

Figure 5:
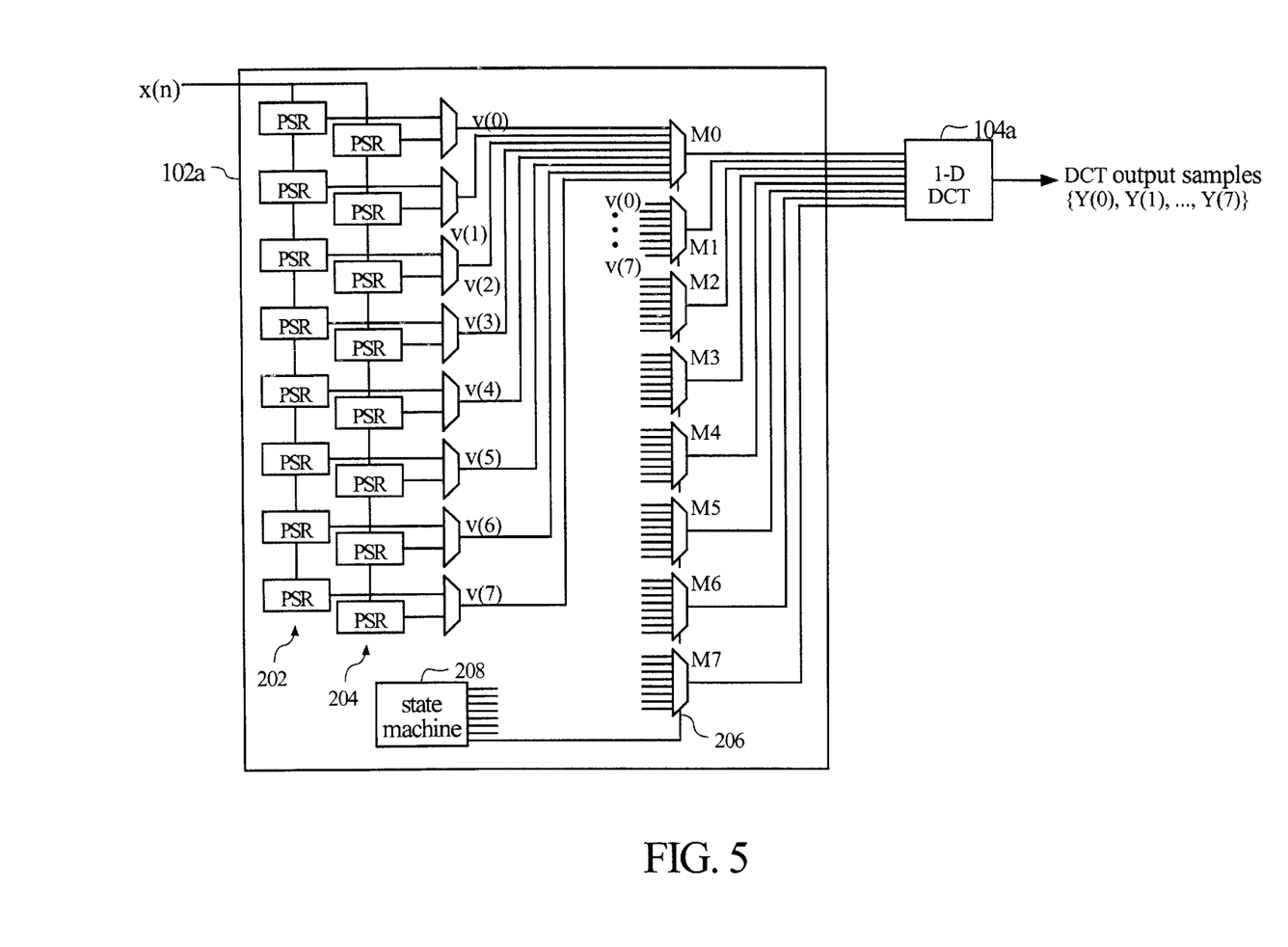
FIG. 5 is a functional block diagram of one embodiment of an input permutation processor in combination with a 1-D DCT processor.

FIG. 5 is a functional block diagram of one embodiment of one input permutation processor in combination with a 1-D DCT processor. It will be appreciated that for each row in the input data a separate combination including permutation processor 102a and 1-D DCT processor 104a is required. For example, when processing 8×8 data blocks, 8 pairs of permutation processors and 1-D DCT processor are required.

Two columns of parallel-to-serial shift registers (PSRs) are provided for double buffering of the input samples, x(n). While new data x(n) is being loaded into one column of PSRs, e.g., 202, the data from the other column, e.g., 204, is clocked out in a bit serial fashion to multiplexers M0, . . . ,M7, and then on to DCT processor 104*a*. The PSRs can be implemented using an array of flip-flops (FFs). It will be appreciated that each CLB in a Xilinx FPGA, for example, provides 2 FFs. Thus, for N=8, 4 CLBs are required to construct a single PSR.

Multiplexers M0, . . . , M7 can be implemented using CLB function generators, wherein each function generator implements 2:1 multiplexer. The 2:1 multiplexers can then be cascaded to implement the larger 8:1 multiplexers M0, . . . , M7. It will be appreciated that the multiplexers do not occupy much FPGA real-estate since they are configured to operate on 1-bit wide data. The select signals, for example, the select signal online 206 to multiplexers M0, . . . , M7 are generated, state machine 208. In one embodiment, state machine 208 includes a 3-bit counter and 8-bit wide look-up table (LUT) for example. The counter provides the addresses for the LUT and the LUT contents reflect the data access pattern defined in FIGS. 3A through 3H.

Figure 6:
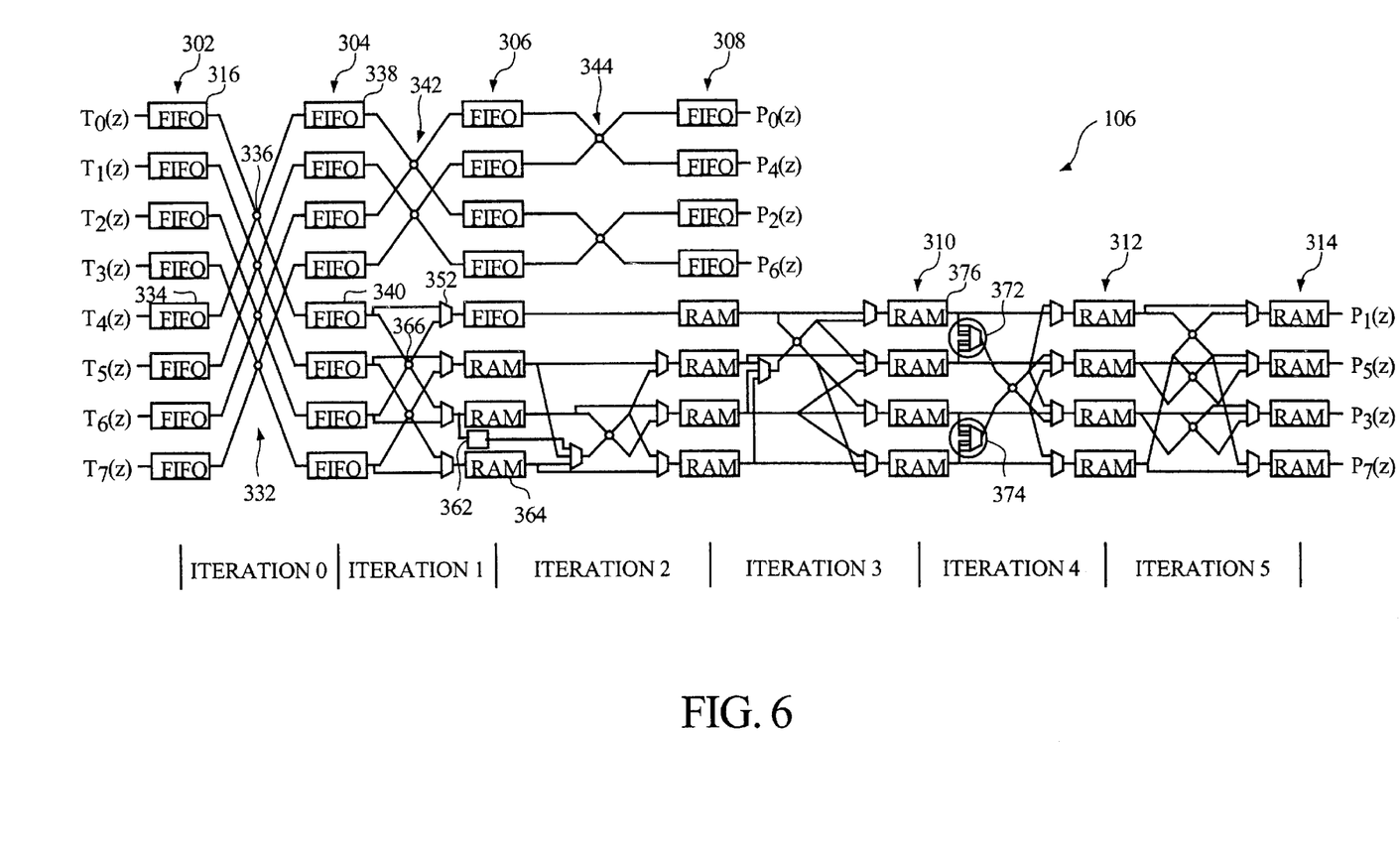
FIG. 6: is a functional block diagram of one embodiment of a polynomial transform processor.

FIG. 6 is a functional block diagram of one embodiment of polynomial transform processor 106. The inputs are designated as $T_i$ (z) (for i=0, 1, . . . 7), and the transform results in polynomial bit-reversed order are designated as $P_k$ (z) (for k=0, 1, . . . 7). Polynomial transform processor 106 include a plurality of columns 302, 304, 306, 308, 310, 312, and 31 of polynomial storage elements. The polynomial storage elements of column 302 store the respective outputs from the 1-DCT processors. Thus, each storage element includes storage for up to 8 1-D DCT output samples using the 8×8 matrix example. For example, $T_0$ (z) defines the DCT output samples generated from the extended diagonal shown in FIG. 3A ($Y_0$, $Y_1$, $Y_2$, $Y_3$, $Y_4$, $Y_5$, $Y_6$, $Y_7$). Polynomial storage element 316 is the storage element associated with $T_0$ (z)

The PT processing primarily includes polynomial butterflies, along with suitable multiplexing at various points in the structure to avoid the introduction of any complex quantities and to implicitly handle "multiplication" by the polynomial transform kernel. In this context, "multiplication" does not refer to an arithmetic product, but rather refers to appropriate indexing of the data and any required sign-change. The sign changes are associated with the polynomial residue reductions that are required in computing the polynomial transform, as known in the art.

A parallel pipeline structure is used to match the latency of the first stage 1-D DCT processing with the throughput of the PT processor. If, for example, the 1-D DCT processing requires 9 clock cycles to execute, the PT must be performed within 9 clock cycles to avoid idling.

At this juncture, a change in notation is made to transition from the 1-D DCT output samples to the polynomial expression. Specifically, relative to 1-D DCT outputs generated from the extended diagonal of FIG. 3A, $T_0$ (z)=$a_0 z^0 + a_1 z^1 + a_2 z^2 + a_3 z^3 + a_4 z^4 + a_5 z^5 + a_6 z^6 + a_7 z^7$, where $a_0 = Y_0$, $a_1 = Y_1$, $a_2 = Y_2$, $a_3 = Y_3$, $a_4 = Y_4$, $a_5 = Y_5$, $a_6 = Y_6$, and $a_7 = Y_7$. Similarly, relative to 1-D DCT outputs generated from the extended diagonal of FIG. 3B, $T_1(z) = b_0 z^0 + b_1 z^1 + b_2 z^2 + b_3 z^3 + b_4 z^4 + b_5 z^5 + b_6 z^6 + b_7 z^7$; relative to FIG. 3C, $T_2(z) = c_0 z^0 + c_1 z^1 + c_2 z^2 + c_3 z^3 + c_4 z^4 + c_5 z^5 + c_6 z^6 + C_7 Z^7$; . . . ; and relative to FIG. 3H, $T_7$ (z)=$h_0 z^0 + h_1 z^1 + h_2 z^2 + h_3 z^3 + h_4 z^4 + h_5 z^5 + h_6 z^6 + h_7 z^7$.

Each polynomial storage element stores a sequence of N 1-D DCT output samples, where N is the number of 1-D DCT output samples produced from an extended diagonal. In one embodiment, selected ones of the polynomial storage elements are implemented using FIFOs to minimize control overhead. See, for example, Alfke, U.S. Pat. No. 5,758,192. Others of the polynomial storage elements are implemented using dualport RAM. See, for example, Freidin et al., U.S. Pat. No. 5,566,123. Thus, known structures for both implementations are available for CLBs of an FPGA.

The polynomial storage elements for $T_0$ (z)–$T_7$ (z) are paired and input to column 332 of polynomial butterflies. For example $T_0$ (z) is paired with $T_4$ (z), and polynomial storage elements 316 and 334 provide input to butterfly 336, which in turn provides input to polynomial storage elements 338 and 340 of column 304.

The PT processing stage consists of several columns of polynomial butterflies. Unlike the butterflies that are used in many FFT algorithms, the PT transform butterflies operate on polynomials as compared to complex tuples. In addition, the butterflies do not include any multipliers, only adders and subtractors. Adders and subtractors can be readily implemented using FPGA function generators.

The first output from each butterfly is generated by adding the input polynomials, and the second output is generated by subtracting the input polynomials. For example, butterfly 36 generates a first output to storage element 338 as a function of $T_0(z)+T_4(z)$ and a second output to storage element 340 as a function of $T_0(z)-T_4(z)$. Thus, storage element 338 receives output that is a function of $(a_0+e_0)z^0+(a_1+e_1)z^1+(a_2+e_2)z^2+(a_3+e_3)z^3+(a_4+e_4)z^4+(a_5+e_5)z^5+^{(a}6+e_6)z^6+a_7+e_7)z^7$; and storage element 340 receives output that is a function of $(a_0-e_0)z^0+(a_1-e_1)z^1+(a_2-e_2)z^2+(a_3-e_3)z^3+(a_4+e_4)z^4+(a_5-e_5)z^5+(a_6-e_6)z^6+(a_7-e_7)z^7$.

Outputs $P_0$ (z), $P_2$ (z), $P_4$ (Z), $P_6$(z) are generated using the implementation described above as applied to columns 304, 306, and 308 of polynomial storage elements and columns 342 and 344 of butterflies. Outputs $P_0$ (z), $P_2$ (z), $P_4$ (z) $P_6$ (z), however, are generated using butterflies in combination with additional multiplexing and shift logic.

The additional multiplexing logic is illustrated with reference to the rows of polynomial storage elements aligned with $T_4$ (z) and $T_6$ (z). The additional multiplexing logic is used to produce new sequences for the rows one iteration later in time. For example, in column 342 of butterflies, rows 4 and 6 are combined using butterfly circuit 356 to produce new sequences one iteration later. One example of a butterfly computation is defined in the equations below:

$Y'(4, i) = \frac{1}{2}(Y(4, i) - Y(6, 8-i))$ $Y'(6,i) = \frac{1}{2}(y(4,i) + y(6, 8-i))$ $i=1,2,3$ $y'(4, 8-i) = \frac{1}{2}(y(4, 8-i) - y(6, i))$ $y'(6, 8-i) = \frac{1}{2}(y(4, 8-i) + y(6, i))$ $i=1,2,3$ The primed variables indicate the new outputs and the notation y.(i,j) references the j-th element in the i-th row of a 2-D data set. It will be appreciated that column elements 0 and 4 are not variables in these equations, and therefore, must pass through the processing phase unaltered in order to be available to later processing stages. The selection signal applied to multiplexer 352 allows the coefficient for terms $z^0$ and $z^4$ from polynomial storage elements 340 and 354 to bypass butterfly 356 and progress unaltered to the next stage (column 306). For all other terms, the polynomial sum and difference are presented at the output of multiplexer 352. The previous example has demonstrate the nature of the calculations required to compute a sub-expression in the polynomial transform. The function of the multiplexers was also explained. Similar functionality, that is, to a pass a sum/difference calculation, or a direct result, is needed at other nodes in the architecture shown in FIG. 6., this is the purpose of all of the multiplexers in the architecture. The exact details are embodied in the mathematical description of the polynomial transform given by Prado. The remaining multiplexer of PT processor 106 perform comparable functions for other terms of the polynomials in later stages of the transform. The basis for the bypasses is found in the math described by Prado.

The mathematical definition of the polynomial transform requires that certain intermediate results must be scaled by ½. It is well know that this can be achieved in binary arithmetic by right shifting a binary value by 1 digit position. Care must be taken to preserve the correct sign of the scaled result. This can be achieved by simply copying the most significant digit of the original word to the most significant digit position in the scaled output result. Block 362 represents a 9-bit register for storage of a scaled intermediate result.

Figure 7:
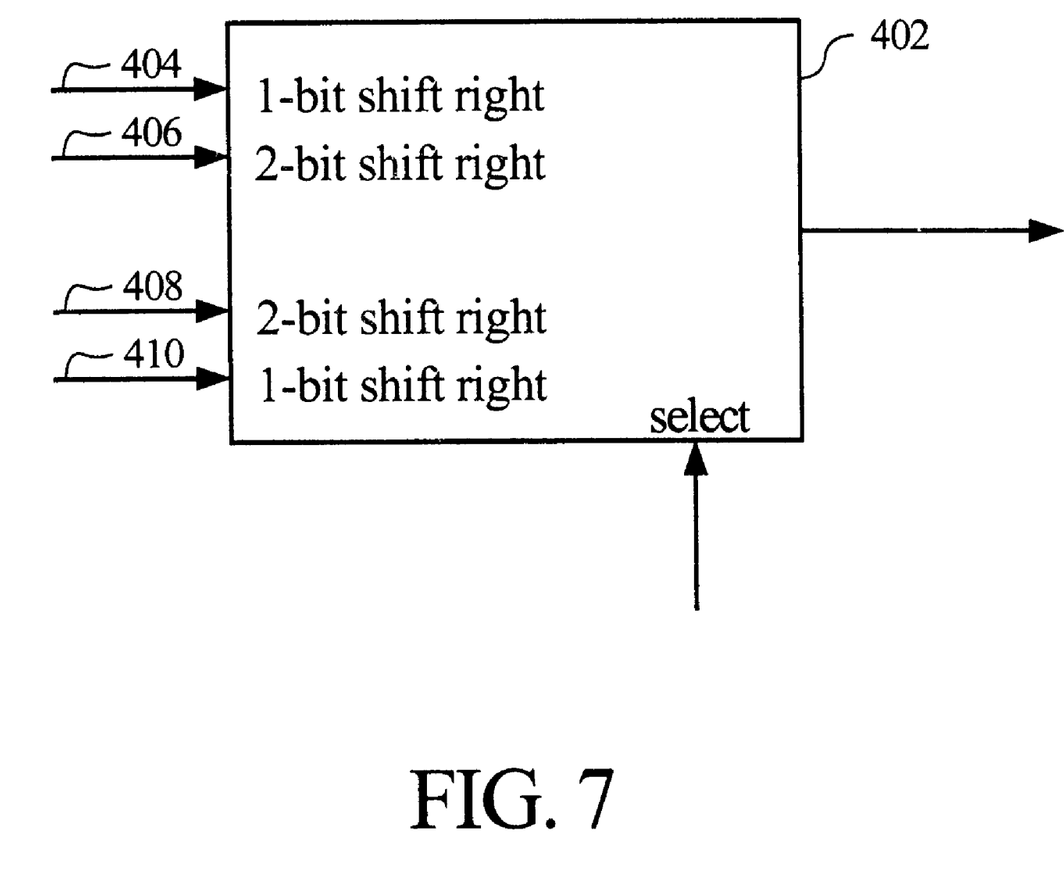
FIG. 7 is a functional block diagram of a shift logic element.

PT processor 106 also includes shift logic elements 372 and 374. FIG. 7 illustrates a functional example of these shift logic elements. Shift logic element 402 includes 4 data input ports: two 1-bit shift right inputs and two 2-bit shift right inputs. Data applied to the 1-bit shift right input ports is shifted right by one bit, and data applied to the 2-bit shift right input ports is shifted right by two bits. A selection signal input is provided to select one of the four in puts as the output. The data selections are made in accordance with the mathematical description of the polynomial transform given by Prado. Relative to shift logic element 372 of FIG. 6, the same data from polynomial storage element 376 is provided as input on lines 404 and 406 to shift logic element 402. Similarly, the same data from polynomial storage element 378 is provided as input on lines 408 and 410 to shift logic element 402. Thus, shift logic element 372 provides as output one of data from storage element 376 shifted right by one bit, data from storage element 376 shifted right by two bits, data from storage element 378 shifted right by one bit, or data from storage element 378 shifted right by two bits.

The present invention is believed to be applicable to a variety of 2-D DCT applications, including video and audio encoding. While the present invention is not so limited, an appreciation of the present invention has been provided by way of specific examples involving 8×8 matrices of data. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A 2-D DCT circuit arrangement comprising:
   an input permutation processor configured and arranged to reorder an input sequence of data samples, wherein reordered data samples are represented as a matrix;
   a plurality of DCT processors coupled to the input permutation processor, each DCT processor arranged to apply a 1-D DCT along an associated extended diagonal of the matrix;
   a polynomial transform processor coupled to the DCT processors, the polynomial transform processor arranged to apply a polynomial transform to output from the 1-D DCTs; and
   an output permutation processor coupled to the polynomial transform processor, the output permutation processor arranged to re-order output data from the polynomial transform.

2. The circuit arrangement of claim 1, wherein the polynomial transform processor includes:
   a plurality of columns of storage elements, each storage element arranged for storage of a polynomial, wherein storage elements in a first column are arranged to receive respective output polynomials from the DCT processors;
   a plurality of radix butterflies, each radix butterfly arranged to receive input polynomials from a pair of storage elements in one column of storage elements and provide output polynomial to a pair of storage elements in another column of storage elements.

3. The circuit arrangement of claim 2, wherein selected ones of the storage elements are arranged as FIFO storage.

4. The circuit arrangement of claim 2, wherein selected ones of the storage elements are RAM storage.

5. The circuit arrangement of claim 2, wherein selected ones of the storage elements are FIFO storage, and selected others of the storage elements are RAM storage.

6. The circuit arrangement of claim 1, the input permutation processor including:
   n sets of parallel-to-serial shift registers, each set including a first parallel-to-serial shift register arranged to receive an input sample, and other parallel-to-serial shift registers in the set coupled in cascade to the first register; and
   n sets of multiplexers, wherein input terminals of each multiplexer in a set are coupled to serial output terminals of the parallel-to-serial shift registers in a corresponding set.

7. The circuit arrangement of claim 6, wherein the polynomial transform processor includes:
   a plurality of columns of storage elements, each storage element arranged for storage of a polynomial, wherein storage elements in a first column are arranged to receive respective output polynomials from the DCT processors;
   a plurality of radix butterflies, each radix butterfly arranged to receive input polynomials from a pair of storage elements in one column of storage elements and provide output polynomials to a pair of storage elements in another column of storage elements.

8. The circuit arrangement of claim 7, wherein selected ones of the storage elements are FIFO storage.

9. The circuit arrangement of claim 7, wherein selected ones of the storage elements are RAM storage.

10. The circuit arrangement of claim 7, wherein selected ones of the storage elements are FIFO storage, and selected others of the storage elements are RAM storage.

11. 2-D DCT circuit arrangement implemented on an FPGA, comprising:
    a plurality of function generators arranged as an input permutation processor to reorder an input sequence of data samples, wherein reordered data samples are represented as a matrix;
    a plurality of function generators arranged as a plurality of DCT processors, each DCT processor coupled to the input permutation processor and arranged to apply a 1-D DCT along an associated extended diagonal of the matrix;
    a plurality of function generators arranged as a polynomial transform processor, the polynomial transform processor coupled to the DCT processors and arranged to apply a polynomial transform to output polynomials from the 1-D DCTs; and a plurality of function generators configured to reorder output data from the polynomial transform.

12. The circuit arrangement of claim 11, wherein the polynomial transform processor includes:

a plurality of function generators arranged as columns of storage elements, each storage element arranged for storage of a polynomial, wherein a first column is arranged to receive respective sets of output polynomials from the DCT processors;

a plurality of function generators arranged as radix butterflies, each radix butterfly coupled to receive input polynomials from a pair of storage elements in one column of storage elements and provide output polynomials to a pair of storage elements in another column of storage elements.

13. The circuit arrangement of claim 12, wherein selected ones of the storage elements are function generators configured as FIFO storage.

14. The circuit arrangement of claim 12, wherein selected ones of the storage elements are function generators configured as RAM storage.

15. The circuit arrangement of claim 12, wherein selected ones of the storage elements are function generators configured as FIFO storage, and selected others of the storage elements are function generators configured d as RAM storage.

16. The circuit arrangement of claim 11, the input permutation processor including:

a plurality of function generators configured as n sets of parallel-to-serial shift registers, each set including a first parallel-to-serial shift register arranged to receive an input sample, and other parallel-to-serial shift registers in the set coupled in cascade to the first register; and a plurality of function generators configured as n sets of multiplexers, wherein input terminals of each multiplexer in a set are coupled to serial output terminals of the parallel-to-serial shift registers in a corresponding set.

17. The circuit arrangement of claim 16, wherein the polynomial transform processor includes:

a plurality of function generators arranged as columns of storage elements, each storage element arranged for storage of a polynomial, wherein a first column is arranged to receive respective output polynomials from the DCT processors;

a plurality of function generators configured and arranged as radix butterflies, each radix butterfly coupled to receive input polynomials from a pair of storage elements in one column of storage elements and provide output polynomials to a pair of storage elements in another column of storage elements.

18. The circuit arrangement of claim 17, wherein selected ones of the storage elements are function generators arranged as FIFO storage.

19. The circuit arrangement of claim 17, wherein selected ones of the storage elements are function generators arranged as RAM storage.

20. The circuit arrangement of claim 17, wherein selected ones of the storage elements are function generators arranged as FIFO storage, and selected others of the storage elements are function generators arranged as RAM storage.

21. A method for constructing a 2-D DCT circuit arrangement, comprising:

configuring a plurality of function generators as an input permutation processor, wherein the input permutation processor reorders input sequences of data samples, wherein reordered data samples are represented as a matrix;

configuring a plurality of function generators as a plurality of DCT processors, wherein each DCT processor is coupled to the input permutation processor and applies a 1-D DCT along associated extended diagonal of the matrix;

configuring a plurality of function generators as a polynomial transform processor, wherein the polynomial transform processor is coupled to the DCT processors and applies a polynomial transform to output from the 1-D DCTs;

configuring a plurality of function generators as an output processor, wherein the output processor re-orders output from the polynomial transform.

22. The method of claim 21, further comprising:

configuring a plurality of function generators as columns of storage elements, wherein each storage element is arranged for storage of a polynomial, and a first column is arranged to receive respective output polynomials from the DCT processors;

configuring a plurality of function generators as radix butterflies, wherein each radix butterfly is arranged to receive input polynomials from a pair of storage elements in one column of storage elements and provide output polynomials to a pair of storage elements in another column of storage elements.

23. The method of claim 22, further comprising configuring selected ones of the storage elements as FIFO storage.

24. The me hod of claim 22, further comprising configuring selected on s of the storage elements as RAM storage.

25. The method of claim 22, further comprising configuring selected ones of the storage elements as FIFO storage, and configuring selected others of the storage elements as RAM storage.

26. The method of claim 21, further comprising:

configuring a plurality of function generators as n sets of parallel-to-serial shift registers, wherein each set includes a first parallel-to-serial shift register coupled to receive an input sample, and other parallel-to-serial shift registers in the set are coupled in cascade to the first register; and configuring a plurality of function generators as n sets of multiplexers, wherein input terminals of each multiplexer in a set are coupled to serial output terminals of the parallel-to-serial shift registers in a corresponding set.

27. The method of claim 26, further comprising:

configuring a plurality of function generators as columns of storage elements, wherein each storage element is arranged for storage of a polynomial, and a first column is arranged to receive respective sets of outputs from the DCT processors configuring a plurality of function generators as radix butterflies, wherein each radix butterfly is coupled to receive inputs from a pair of storage elements in one column of storage elements and provide outputs to a pair of storage elements in another column of storage elements.

28. The method of claim 27, further comprising configuring selected ones of the storage elements as FIFO storage.

29. The method of claim 27, further comprising configuring selected ones of the storage elements as RAM storage.

30. The method of claim 27, further comprising configuring selected ones of the storage elements as FIFO storage, and configuring selected others of the storage elements as RAM storage.

* * * * *